(12) United States Patent
Arise et al.

(10) Patent No.: US 10,461,361 B2
(45) Date of Patent: Oct. 29, 2019

(54) NONAQUEOUS ELECTROLYTE SECONDARY BATTERY INSULATING POROUS LAYER

(71) Applicant: Sumitomo Chemical Company, Limited, Tokyo (JP)

(72) Inventors: Ichiro Arise, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/965,608

(22) Filed: Apr. 27, 2018

(65) Prior Publication Data

US 2018/0316052 A1     Nov. 1, 2018

(30) Foreign Application Priority Data

Apr. 28, 2017    (JP) ................. 2017-089472

(51) Int. Cl.
*H01M 10/052*     (2010.01)
*H01M 10/0525*     (2010.01)
(Continued)

(52) U.S. Cl.
CPC ........... *H01M 10/0525* (2013.01); *B32B 5/16* (2013.01); *B32B 5/18* (2013.01); *C08K 3/20* (2013.01);
(Continued)

(58) Field of Classification Search
CPC ........ H01M 2/14; H01M 4/133; H01M 4/134; H01M 4/62; H01M 4/661; H01M 10/0525;
(Continued)

(56) References Cited

U.S. PATENT DOCUMENTS

| 2009/0098450 A1 | 4/2009 | Kikuchi et al. |
| 2011/0039145 A1 | 2/2011 | Abe et al. |

(Continued)

FOREIGN PATENT DOCUMENTS

| CN | 104051696 A | 9/2014 |
| CN | 104620417 A | 5/2015 |

(Continued)

OTHER PUBLICATIONS

Office Action dated May 15, 2018 in KR Application No. 10-2018-0047701.

(Continued)

*Primary Examiner* — Amanda C. Walke
(74) *Attorney, Agent, or Firm* — Panitch Schwarze Belisario & Nadel LLP (57) ABSTRACT

A nonaqueous electrolyte secondary battery insulating porous layer which has an excellent discharge output characteristic is provided. The insulating porous layer is arranged such that an aspect ratio of a projection image of an inorganic filler at a surface of the insulating porous layer is in a range of 1.4 to 4.0 and respective peak intensities $I_{(hkl)}$ and $I_{(abc)}$ of any diffraction planes (hkl) and (abc) of the insulating porous layer satisfy the following Formula (1). The peak intensities obtained from the diffraction planes (hkl) and (abc) orthogonal to each other are measured using a wide-angle X-ray diffraction method, and a maximum value of the peak intensity ratio is in a range of 1.5 to 300 when calculated by the following Formula (2):

$$I_{(hkl)} > I_{(abc)} \quad (1)$$

$$I_{(hkl)}/I_{(abc)} \quad (2).$$

8 Claims, 1 Drawing Sheet

PICTURE OF DEGREE OF ORIENTATION

ORIENTATION "HIGH"

PO MICROPOROUS FILM

ORIENTATION "LOW"

FILLER POROUS LAYER (51) Int. Cl.
- *H01M 4/66* (2006.01)
- *H01M 4/133* (2010.01)
- *H01M 4/134* (2010.01)
- *H01M 10/0569* (2010.01)
- *H01M 2/14* (2006.01)
- *H01M 4/62* (2006.01)
- *C08K 3/20* (2006.01)
- *B32B 5/16* (2006.01)
- *B32B 5/18* (2006.01)
- *H01G 11/52* (2013.01)
- *C08K 3/22* (2006.01)
- *H01M 2/16* (2006.01)
- *H01M 4/02* (2006.01)

(52) U.S. Cl.
CPC ............... *C08K 3/22* (2013.01); *H01G 11/52* (2013.01); *H01M 2/14* (2013.01); *H01M 2/166* (2013.01); *H01M 2/1653* (2013.01); *H01M 2/1686* (2013.01); *H01M 4/133* (2013.01); *H01M 4/134* (2013.01); *H01M 4/62* (2013.01); *H01M 4/661* (2013.01); *H01M 10/0569* (2013.01); *H01M 2004/027* (2013.01); *H01M 2004/028* (2013.01)

(58) Field of Classification Search
CPC ........ H01M 10/0569; B32B 5/16; B32B 5/18; B32B 5/22; B32B 27/32; H01G 10/52; H01G 11/52; C08K 3/20; C08K 3/2244; C08K 3/22
USPC .......................................................... 429/209
See application file for complete search history.

(56) References Cited

U.S. PATENT DOCUMENTS

| | | | |
|---|---|---|---|
| 2013/0017430 A1 | 1/2013 | Terakawa et al. | |
| 2013/0288132 A1 | 10/2013 | Terakawa et al. | |
| 2015/0050545 A1 | 2/2015 | Murata et al. | |
| 2015/0318528 A1 | 11/2015 | Iwai et al. | |
| 2016/0362541 A1 | 12/2016 | Mihara et al. | |
| 2016/0372730 A1 | 12/2016 | Uchida et al. | |
| 2017/0155113 A1* | 6/2017 | Hashiwaki | H01M 2/1653 |
| 2017/0155120 A1* | 6/2017 | Yoshimaru | H01M 2/1653 |
| 2017/0162849 A1 | 6/2017 | Murakami et al. | |
| 2017/0167850 A1* | 6/2017 | Bridges | H04N 5/35554 |
| 2017/0194612 A1 | 7/2017 | Murata et al. | |
| 2017/0194613 A1 | 7/2017 | Murata et al. | |
| 2018/0233730 A1* | 8/2018 | Ohya | H01M 2/1686 |
| 2018/0254453 A1* | 9/2018 | Yoshimaru | H01M 2/1653 |
| 2018/0254455 A1* | 9/2018 | Yoshimaru | H01M 2/1653 |
| 2018/0316053 A1* | 11/2018 | Kurakane | H01M 10/0525 |

FOREIGN PATENT DOCUMENTS

| | | |
|---|---|---|
| CN | 106029756 A | 10/2016 |
| JP | 2007311367 A | 11/2007 |
| JP | 2007317405 A | 12/2007 |
| JP | 2008210782 A | 9/2008 |
| JP | 2010108753 A | 5/2010 |
| JP | 2014017264 A | 1/2014 |
| KR | 20080068722 A | 7/2008 |
| KR | 20100135955 A | 12/2010 |
| KR | 20120093420 A | 8/2012 |
| KR | 20120104425 A | 9/2012 |
| KR | 20160013941 A | 2/2016 |
| KR | 20160078457 A | 7/2016 |
| KR | 20160094846 A | 8/2016 |
| KR | 20170089031 A | 8/2017 |
| WO | 2015079304 A1 | 6/2015 |

OTHER PUBLICATIONS

Office Action dated Aug. 22, 2018 in KR Application No. 10-2018-0047701.

* cited by examiner

FIG. 1

PICTURE OF DEGREE OF ORIENTATION

FIG. 2

NONAQUEOUS ELECTROLYTE SECONDARY BATTERY INSULATING POROUS LAYER

This Nonprovisional application claims priority under 35 U.S.C. § 119 on Patent Application No. 2017-089472 filed in Japan on Apr. 28, 2017, the entire contents of which are hereby incorporated by reference.

TECHNICAL FIELD

The present invention relates to an insulating porous layer for a nonaqueous electrolyte secondary battery (hereinafter referred to as a "nonaqueous electrolyte secondary battery insulating porous layer"). The present invention also relates to (i) a laminated separator for a nonaqueous electrolyte secondary battery (hereinafter referred to as a "nonaqueous electrolyte secondary battery laminated separator"), (ii) a member for a nonaqueous electrolyte secondary battery (hereinafter referred to as a "nonaqueous electrolyte secondary battery member"), and (iii) a nonaqueous electrolyte secondary battery, each of which includes the nonaqueous electrolyte secondary battery insulating porous layer.

BACKGROUND ART

Nonaqueous electrolyte secondary batteries such as a lithium secondary battery are currently in wide use as batteries for devices such as a personal computer, a mobile telephone, and a portable information terminal.

A device equipped with a lithium ion battery includes a wide variety of electrical protection circuits, provided in a battery charger or a battery pack, so that the battery operates normally and safely. However, if a breakdown or a malfunction, for example, occurs in the protection circuits, the lithium ion battery may be continuously recharged. This may cause oxidative and reductive degradation of an electrolyte on surfaces of a positive electrode and a negative electrode both of which generate heat, oxygen release caused by decomposition of a positive electrode active material, and even deposition of metallic lithium on the negative electrode. This may eventually cause the lithium ion battery to fall into a thermal runaway. There is also a danger that ignition or burst may occur in the lithium ion battery, depending on the situation.

In order to safely stop a battery before such a dangerous thermal runaway occurs, most lithium ion batteries currently include, as a separator, a porous base material which contains a polyolefin as a main component and which has a shutdown function of clogging pores present in the porous base material when a temperature inside the battery is raised due to some defect and reaches approximately 130° C. to 140° C. The shutdown function is exhibited when a temperature inside the battery rises. This stops passage of ions through the separator, and thus allows the battery to safely stop.

Meanwhile, a porous base material which contains a polyolefin as a main component melts when the porous base material is exposed to a temperature equal to or higher than a temperature at which the shutdown function works. This is because heat resistance of such a porous base material is low. This may cause a short circuit inside a battery and may consequently lead to ignition or explosion of the battery. In view of the above, with an aim to improve the heat resistance of the porous base material, efforts are being made to develop a separator that includes a porous layer containing a filler and a resin on at least one surface of the porous base material.

For example, Patent Literature 1 discloses a nonaqueous secondary battery separator arranged such that a porous layer, containing a plate-shaped inorganic filler and having a porosity of 60% to 90%, is provided on at least one surface of a porous base material. Further, Patent Literature 1 discloses that the occurrence of a short circuit can be prevented by setting a degree of orientation of the plate-shaped inorganic filler in a specific range. The degree of orientation of the plate-shaped inorganic filler is calculated from an azimuth-dependency of scattering peak intensity in an X-ray diffraction, in which X-rays are incident along a cross sectional direction of the separator and perpendicularly to a cross section of the separator.

CITATION LIST

Patent Literature

[Patent Literature 1] Japanese Patent Application Publication, Tokukai, No. 2010-108753 (Publication Date: May 13, 2010)

SUMMARY OF INVENTION

Technical Problem

However, a nonaqueous electrolyte secondary battery including the above-described conventional porous layer did not have a sufficient discharge output characteristic.

Solution to Problem

As a result of diligent studies made by the inventors of the present invention, the inventors have found that a nonaqueous electrolyte secondary battery has an improved discharge output characteristic, when the nonaqueous electrolyte secondary battery includes, as a separator or a separator member, a porous layer containing an inorganic filler and a resin, which porous layer is arranged such that (i) an aspect ratio of a projection image of the inorganic filler at a surface of the porous layer is within a specific range and (ii) a degree of orientation of the inorganic filler at the surface of the porous layer is within in a specific range. The degree of orientation of the filler is obtained from a ratio of respective peak intensities in any diffraction planes orthogonal to each other, which peak intensities are obtained by measuring the porous layer by a wide-angle X-ray diffraction method. Consequently, the inventors have accomplished the present invention.

The present invention encompasses any of aspects described in the following [1] to [4].

[1] A nonaqueous electrolyte secondary battery insulating porous layer containing an inorganic filler and a resin, wherein:

an aspect ratio of a projection image of the inorganic filler at a surface of the nonaqueous electrolyte secondary battery insulating porous layer is in a range of 1.4 to 4.0;

respective peak intensities $I_{(hkl)}$ and $I_{(abc)}$ of any diffraction planes (hkl) and (abc) of the nonaqueous electrolyte secondary battery insulating porous layer satisfy the following Formula (1), the peak intensities being obtained from the diffraction planes (hkl) and (abc) orthogonal to each other by measurement by use of a wide-angle X-ray diffraction method; and a maximum value of a peak intensity ratio is in a range of 1.5 to 300, the peak intensity ratio being calculated by the following Formula (2):

$$I_{(hkl)} > I_{(abc)} \quad (1), \text{ and}$$

$$I_{(hkl)}/I_{(abc)} \quad (2).$$

[2] A nonaqueous electrolyte secondary battery laminated separator including: a porous base material containing a polyolefin as a main component; and a nonaqueous electrolyte secondary battery insulating porous layer described in [1], the nonaqueous electrolyte secondary battery insulating porous layer being provided on one surface or both surfaces of the porous base material.

[3] A nonaqueous electrolyte secondary battery member including: a positive electrode; a nonaqueous electrolyte secondary battery insulating porous layer described in [1] or a nonaqueous electrolyte secondary battery laminated separator described in [2]; and a negative electrode, the positive electrode, the nonaqueous electrolyte secondary battery insulating porous layer or the nonaqueous electrolyte secondary battery laminated separator, and the negative electrode being provided in this order.

[4] A nonaqueous electrolyte secondary battery including: a nonaqueous electrolyte secondary battery insulating porous layer described in [1] or a nonaqueous electrolyte secondary battery laminated separator described in [2].

Advantageous Effects of Invention

The nonaqueous electrolyte secondary battery insulating porous layer in accordance with an embodiment of the present invention advantageously allows a nonaqueous electrolyte secondary battery including the nonaqueous electrolyte secondary battery insulating porous layer to have an improved discharge output characteristic (e.g., 20 C/0.2 C rate characteristic).

BRIEF DESCRIPTION OF DRAWINGS

FIG. 1 is a schematic view illustrating respective structures of a porous layer containing an inorganic filler in a case where the inorganic filler is in a high orientation state (left) and in a case where the inorganic filler is in a low orientation state (right). In FIG. 1, the term "PO microporous film" means a porous base material which contains a polyolefin as a main component and which serves as a base material for a nonaqueous electrolyte secondary battery insulating porous layer in accordance with an embodiment of the present invention. Further, in FIG. 1, the "filler porous layer" means a nonaqueous electrolyte secondary battery insulating porous layer in accordance with an embodiment of the present invention which contains an inorganic filler and a resin.

DESCRIPTION OF EMBODIMENTS

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated.

Embodiment 1: Nonaqueous Electrolyte Secondary Battery Insulating Porous Layer

A nonaqueous electrolyte secondary battery insulating porous layer (hereinafter, also referred to as simply a "porous layer") in accordance with Embodiment 1 of the present invention is a nonaqueous electrolyte secondary battery insulating porous layer containing an inorganic filler and a resin, wherein: an aspect ratio of a projection image of the inorganic filler at a surface of the nonaqueous electrolyte secondary battery insulating porous layer (hereinafter, also referred to as a "porous layer surface") is in a range of 1.4 to 4.0; respective peak intensities $I_{(hkl)}$ and $I_{(abc)}$ of any diffraction planes (hkl) and (abc) of the nonaqueous electrolyte secondary battery insulating porous layer satisfy the following Formula (1), the peak intensities being obtained from the diffraction planes (hkl) and (abc) orthogonal to each other by measurement by use of a wide-angle X-ray diffraction method; and a maximum value of a peak intensity ratio is in a range of 1.5 to 300, the peak intensity ratio being calculated by the following Formula (2):

$$I_{(hkl)} > I_{(abc)} \quad (1), \text{ and}$$

$$I_{(hkl)}/I_{(abc)} \quad (2).$$

The nonaqueous electrolyte secondary battery insulating porous layer in accordance with an embodiment of the present invention can be used as a constituent member of a nonaqueous electrolyte secondary battery, and preferably as a constituent member of a nonaqueous electrolyte secondary battery laminated separator (described later) in accordance with an embodiment of the present invention. Specifically, the nonaqueous electrolyte secondary battery insulating porous layer in accordance with an embodiment of the present invention can constitute a nonaqueous electrolyte secondary battery laminated separator in accordance with an embodiment of the present invention when the nonaqueous electrolyte secondary battery insulating porous layer is provided on one surface or both surfaces of a porous base material containing a polyolefin as a main component.

Figure 1:
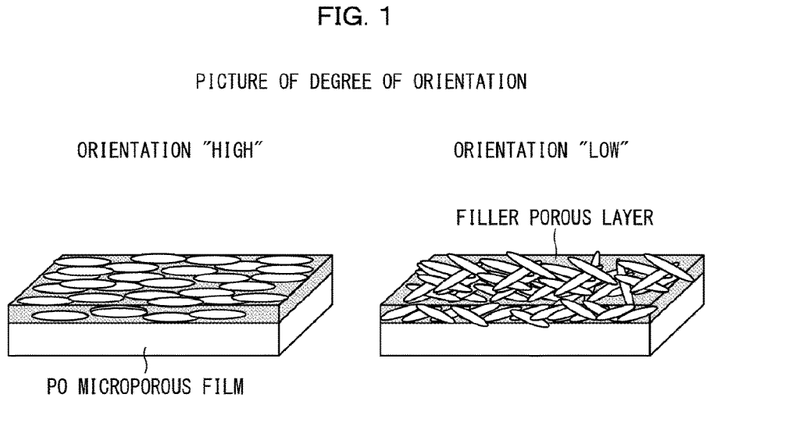

Both of the "aspect ratio of a projection image of the inorganic filler at a surface of the porous layer" and the "maximum value of . . . the peak intensity ratio being calculated . . . by the following Formula (2)" are indicators of an orientation state of the inorganic filler in the porous layer. FIG. 1 is a schematic view showing respective states of the inorganic filler in the porous layer in a case where the inorganic filler is in a high orientation state and in a case where the inorganic filler is in a low orientation state. FIG. 1 shows (i) on the left, a view schematically illustrating a structure of the porous layer in a case where the inorganic filler in the porous layer is in a high orientation state and accordingly highly anisotropic and (ii) on the left, a view schematically illustrating a structure of the porous layer in a case where the inorganic filler in the porous layer is in a low orientation state and accordingly less anisotropic.

The porous layer in accordance with an embodiment of the present invention contains an inorganic filler and a resin. The porous layer has a structure in which many pores, connected to one another, are provided. Accordingly, the porous layer is a layer through which a gas or a liquid can pass from one surface to the other. Further, in a case where the porous layer in accordance with an embodiment of the present invention is used as a constituent member of a nonaqueous electrolyte secondary battery laminated separator, the porous layer can be a layer which, serving as an outermost layer of the laminated separator, comes in contact with an electrode.

It is preferable that the resin contained in porous layer in accordance with an embodiment of the present invention be insoluble in an electrolyte of a battery and be electrochemically stable when the battery is in normal use. Concrete examples of the resin encompass: polyolefins such as polyethylene, polypropylene, polybutene, and an ethylene-propylene copolymer; fluorine-containing resins such as polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; a fluorine-containing rubber having a glass transition temperature of equal to or less than 23° C., among the fluorine-containing resins; aromatic polyamides; wholly aromatic polyamides (aramid resin); rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, polyether amide, and polyester; and water-soluble polymers such as polyvinyl alcohol, polyethylene glycol, cellulose ether, sodium alginate, polyacrylic acid, polyacrylamide, and polymethacrylic acid.

Also, it is possible to suitably use a water-insoluble polymer as the resin contained in the porous layer in accordance with an embodiment of the present invention. In other words, the porous layer in accordance with an embodiment of the present invention containing such a water-insoluble polymer (e.g., acrylate resin) as the resin is produced preferably with the use of an emulsion obtained by dispersing the water-insoluble polymer in an aqueous solvent.

Note that the water-insoluble polymer herein means a polymer that does not dissolve in an aqueous solvent but becomes particles so as to be dispersed in an aqueous solvent. The "water-insoluble polymer" refers to a polymer which has an insoluble content equal to or greater than 90% by weight in a case where 0.5 g of the polymer is dissolved in 100 g of water at 25° C. Meanwhile, the "water-soluble polymer" refers to a polymer which has an insoluble content of less than 0.5% by weight in a case where 0.5 g of the polymer is dissolved in 100 g of water at 25° C. The shape of the particles of the water-insoluble polymer is not limited to any particular one, but is preferably a spherical shape.

The water-insoluble polymer, which is polymer particles, is produced by, for example, polymerizing, in an aqueous solvent, a monomer composition containing a monomer (described later).

Examples of the monomer constituting the water-insoluble polymer encompass styrene, vinyl ketone, acrylonitrile, methyl methacrylate, ethyl methacrylate, glycidyl methacrylate, glycidyl acrylate, methyl acrylate, ethyl acrylate, and butyl acrylate.

Examples of the polymer also encompass, in addition to a homopolymer of the monomer, a copolymer of two or more kinds of monomers. Examples of the copolymer encompass: fluorine-containing resins such as polytetrafluoroethylene, a tetrafluoroethylene-hexafluoropropylene copolymer, an ethylene-tetrafluoroethylene copolymer, and polyvinylidene fluoride; melamine resin; urea resin; polyethylene; polypropylene; polyacrylic acid; and polymethacrylic acid.

The aqueous solvent contains water. This aqueous solvent is not limited to any particular one, provided that the water-insoluble polymer particles can be dispersed in the aqueous solvent.

The aqueous solvent may contain, at any ratio, an organic solvent which can be dissolved in water. Examples of such an organic solvent encompass methanol, ethanol, isopropyl alcohol, acetone, tetrahydrofuran, acetonitrile, and N-methylpyrrolidone. The aqueous solvent may also contain a surfactant such as sodium dodecylbenzene sulfonate, a dispersing agent such as a polyacrylic acid or a sodium salt of carboxymethyl cellulose, and/or the like. In a case where the aqueous solvent is used, one kind or a mixture of two or more kinds of the above aqueous solvents can be used. Meanwhile, in a case where an additive(s) such as the surfactant is used, one kind or a mixture of two or more kinds of the above additives can be used. In a case where the organic solvent is used, a ratio by weight of the organic solvent to water is 0.1% by weight to 99% by weight, preferably 0.5% by weight to 80% by weight, and further preferably 1% by weight to 50% by weight.

Note that the porous layer in accordance with an embodiment of the present invention may contain a single kind of resin or may alternatively contain a mixture of two or more kinds of resins.

Further, concrete examples of the aromatic polyamides encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aromatic polyamides, poly(paraphenylene terephthalamide) is more preferable.

Among the above resins, a polyolefin, a fluorine-containing resin, an aromatic polyamide, a water-soluble polymer, or the water-insoluble polymer in the form of particles dispersed in the aqueous solvent is more preferable. Among these resins, in a case where the porous layer is arranged so as to face a positive electrode, a fluorine-containing resin is still more preferable, and a polyvinylidene fluoride-based resin is particularly preferable. This is because such a resin makes it easy to maintain various properties, such as a rate characteristic and a resistance characteristic (solution resistance), of a nonaqueous electrolyte secondary battery even in a case where the nonaqueous electrolyte secondary battery suffers acidic deterioration during operation of the nonaqueous electrolyte secondary battery. Examples of the polyvinylidene fluoride-based resin encompass: a homopolymer of vinylidene fluoride (that is, polyvinylidene fluoride); and a copolymer of vinylidene fluoride and at least one monomer selected from the group consisting of hexafluoropropylene, tetrafluoroethylene, trifluoroethylene, trichloroethylene, and vinyl fluoride is particularly preferable.

Further, the water-soluble polymer or the water-insoluble polymer in the form of particles dispersed in the aqueous solvent is more preferable in view of a process and an environmental load, because water can be used as a solvent to form the porous layer. The water-soluble polymer is particularly preferably cellulose ether or sodium alginate, and particularly preferably cellulose ether.

Concrete examples of the cellulose ether encompass carboxymethyl cellulose (CMC), hydroxyethyl cellulose (HEC), carboxyethyl cellulose, methyl cellulose, ethyl cellulose, cyanoethyl cellulose, and oxyethyl cellulose. The cellulose ether is more preferably CMC or HEC, and particularly preferably CMC, because CMC and HEC less degrade in use over a long term and are excellent in chemical stability.

In view of adhesion of particles of an inorganic filler, the water-insoluble polymer in the form of particles dispersed in the aqueous solvent is preferably a homopolymer of an acrylate monomer, such as methyl methacrylate, ethyl methacrylate, glycidyl methacrylate, glycidyl acrylate, methyl acrylate, ethyl acrylate, or butyl acrylate. Alternatively, the water-insoluble polymer is preferably a copolymer of two or more kinds of the monomers.

A lower limit of a content of the resin in the porous layer in accordance with an embodiment of the present invention is preferably not less than 1% by weight, and more preferably not less than 2% by weight, with respect to a total weight of the porous layer. Meanwhile, an upper limit of the content of the resin in the porous layer in accordance with an embodiment of the present invention is preferably not greater than 50% by weight, and more preferably not greater than 30% by weight. It is preferable that a content of the PVDF-based resin be not less than 1% by weight, in view of improvement of cohesion of particles of a filler, in other words, in view of preventing the filler from falling out of the porous layer. It is preferable that the content of the PVDF-based resin be not greater than 50% by weight, in view of a battery characteristic (in particular, resistance to ion permeation) and heat resistance.

The porous layer in accordance with an embodiment of the present invention contains an inorganic filler. A lower limit of a content of the inorganic filler is preferably not less than 50% by weight, more preferably not less than 70% by weight, and still more preferably not less than 90% by weight, with respect to a total weight of the inorganic filler and the resin constituting the porous layer in accordance with an embodiment of the present invention. Meanwhile, an upper limit of the content of the inorganic filler in the porous layer in accordance with an embodiment of the present invention is preferably not greater than 99% by weight, and more preferably not greater than 98% by weight. In view of heat resistance, the content of the inorganic filler is preferably not less than 50% by weight. Meanwhile, in view of cohesion of particles of the inorganic filler, the content of the inorganic filler is preferably not greater than 99% by weight. Containing the inorganic filler allows a separator including the porous layer to have improved slidability and improved heat resistance. The inorganic filler is not limited to a particular one, provided that the inorganic filler is stable in a nonaqueous electrolyte and is also electrochemically stable. In view of ensuring safety of a battery, the inorganic filler is preferably a filler which has a heat-resistant temperature of not less than 150° C.

The inorganic filler is not limited to a particular one, and is typically an insulating filler. The inorganic filler is preferably an inorganic substance containing at least one metal element selected from the group consisting of aluminum, zinc, calcium, zirconium, silicon, magnesium, barium, and boron, and more preferably, an inorganic substance containing aluminum. Further, the inorganic filler preferably contains an oxide of the metal element.

More specifically, examples of the inorganic filler encompasses titanium oxide, alumina ($Al_2O_3$), zinc oxide (ZnO), calcium oxide (CaO), zirconium oxide ($ZrO_2$), silica, magnesia, barium oxide, boron oxide, mica, wollastonite, attapulgite, and boehmite (monohydrated alumina). The above inorganic fillers may be used alone or in combination of two or more thereof.

The inorganic filler contained in the porous layer in accordance with an embodiment of the present invention preferably contains alumina and a plate-shaped filler. The plate-shaped filler can be, for example, at least one filler selected from the group consisting of fillers respectively made of zinc oxide (ZnO), mica, and boehmite among the above metal oxides.

The inorganic filler preferably has a volume average particle diameter of 0.01 μm to 11 μm in view of (i) achievement of good adhesion and good slidability of the porous layer and (ii) formability of a laminated body. The lower limit of the volume average particle diameter is preferably not less than 0.05 μm and more preferably not less than 0.1 μm. Meanwhile, the upper limit of the volume average particle diameter is preferably not greater than 10 μm, more preferably not greater than 5 μm, and particularly preferably not greater than 1 μm.

The inorganic filler can be in any shape and is not limited to a particular shape. The filler may be, for example, a particulate filler. Example shapes of particles of the inorganic filler encompass a spherical shape, an elliptical shape, a plate shape, a bar shape, an indefinite irregular shape, a fiber shape, and shapes, such as a peanut-like shape and/or a tetrapod-like shape, which are formed by thermal fusion bonding of individual particles having a spherical shape or a pillar shape. In view of prevention of the occurrence of a short circuit in the battery, the inorganic filler is made of preferably (i) plate-shaped particles and/or (ii) primary particles that have not aggregated. Further, in view of ion permeation, the inorganic filler is made of preferably particles having a shape with any of protrusions, hollows, constrictions, bumps and bulges, which (i) make the particles unable to easily form close packing of particles in the porous layer and (ii) also make it easy to form a gap between particles. Examples of such a shape encompass: an indefinite irregular shape, such as a dendritic shape, a coral-like shape, or a tuft-like shape; a fiber shape; and a shape, such as a peanut-like shape and/or a tetrapod-like shape, which are formed by thermal fusion bonding of individual particles. The inorganic filler still more preferably has a shape, such as a peanut-like shape and/or a tetrapod-like shape, which is obtained by thermal fusion bonding of individual particles having a spherical shape and/or a pillar shape.

The filler forms fine bumps on a surface of the porous layer, thereby improving the slidability. A filler including (i) plate-shaped particles and/or (ii) primary particles that have not aggregated forms finer bumps on the surface of the porous layer, so that the porous layer has better adhesion to an electrode.

Meanwhile, in the porous layer in accordance with an embodiment of the present invention, an atomic mass percentage of oxygen of the metal oxide contained in the inorganic filler is preferably 10% to 50%, and more preferably 20% to 50%. The term "atomic mass percentage of oxygen" in an embodiment of the present invention means a ratio, in percentage, of a mass of oxygen atoms in a metal oxide with respect to a total mass of the metal oxide. For example, in the case of zinc oxide, since the atomic mass of zinc is (65.4), the atomic mass of oxygen is (16.0), and accordingly the molecular mass of zinc oxide (ZnO) is 81.4 (=65.4+16.0), the atomic mass percentage of oxygen in zinc oxide is 16.0/81.4*100=20(%).

The atomic mass percentage of oxygen of the metal oxide in the above range keeps (i) suitable affinity between the inorganic filler and a solvent or a dispersion medium in a coating solution for use in a method (described later) of producing the porous layer and also (ii) a suitable distance between particles of the inorganic filler. This makes it possible to have a good dispersibility of the coating solution. This consequently makes it possible to control the "aspect ratio of a projection image of the inorganic filler at a surface of the porous layer" and the "degree of orientation of the porous layer" so that the "aspect ratio of a projection image of the inorganic filler at a surface of the porous layer" and the "degree of orientation of the porous layer" are in suitable specified ranges, respectively. In light of this, the percentage by mass of oxygen atoms of the metal oxide is preferably in the above range.

The aspect ratio of the inorganic filler itself contained in the porous layer in accordance with an embodiment of the present invention is expressed as an average value of a ratio between the length of a short axis (short-axis diameter) and the length of a long axis (long-axis diameter) of 100 particles, which do not overlap each other in a thickness direction of the porous layer in an SEM image obtained in observation of the inorganic filler from vertically above the inorganic filler in a case where the inorganic filler is placed on a plane. The aspect ratio of the inorganic filler itself is preferably 1 to 10, more preferably 1.1 to 8 and still more preferably 1.2 to 5. The aspect ratio of the inorganic filler itself in the above range makes it possible to control a porous layer in accordance with an embodiment of the present invention such that, in a case where the porous layer is formed by a method described later, an orientation state of the inorganic filler and uniformity of a distribution of the inorganic filler at a porous layer surface are controlled to be within preferable ranges, respectively.

The porous layer in accordance with an embodiment of the present invention may contain a component other than the above-described inorganic filler and the resin. Examples of such a component encompass a surfactant, a wax, and a binder resin. A content of such a component is preferably 0% by weight to 50% by weight with respect to a total weight of the porous layer.

The porous layer in accordance with an embodiment of the present invention has an average thickness of preferably 0.5 μm to 10 μm, and more preferably 1 μm to 5 μm, per surface of the porous base material, in order to ensure (i) adhesion of the porous layer to an electrode and (ii) a high energy density.

The porous layer in accordance with an embodiment of the present invention preferably has a structure that is sufficiently porous, in view of ion permeability. Specifically, the porous layer preferably has a porosity of 30% to 60%.

Further, the porous layer in accordance with an embodiment of the present invention has an average pore diameter of preferably 20 nm to 100 nm.

<Aspect Ratio of Projection Image of Inorganic Filler at Porous Layer Surface>

An aspect ratio of a projection image of the inorganic filler at a surface of the porous layer is preferably 1.4 to 4.0, and more preferably 1.5 to 2.3. The aspect ratio here is a value obtained by: (i) taking an electron micrograph (SEM image) of a surface of a porous layer from above (vertically above) the porous layer, by using a scanning electron microscope (SEM); (ii) producing a projection image of the inorganic filler from the electron micrograph; and calculating a ratio between the length of a long axis (long-axis diameter)/the length of a short axis (short-axis diameter) of the projection image of the inorganic filler. In other words, the aspect ratio indicates an observed shape of the inorganic filler at the surface of the porous layer in a case where the inorganic filler is observed from directly above the porous layer.

Figure 2:
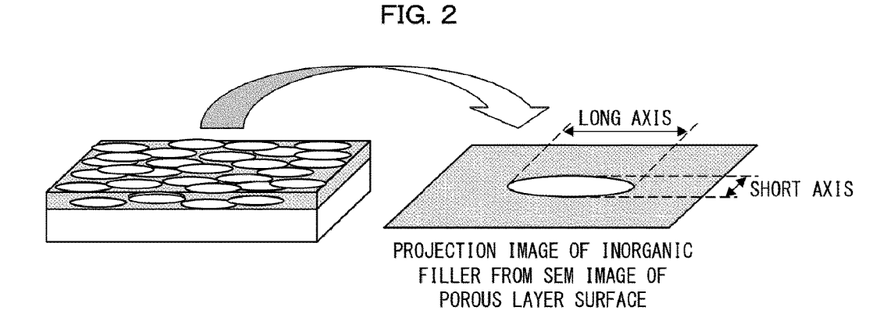
FIG. 2 is a schematic view illustrating a projection image of an inorganic filler at a surface of the nonaqueous electrolyte secondary battery insulating porous layer in accordance with an embodiment of the present invention.

FIG. 2 shows a schematic view of a projection image of an inorganic filler, which projection image is produced from an SEM image of a porous layer surface described above. FIG. 2 is a schematic view showing a projection image of an inorganic filler at a surface of the nonaqueous electrolyte secondary battery insulating porous layer in accordance with an embodiment of the present invention.

The aspect ratio is specifically measured by, for example, a method including the following steps (1) to (4).

Note that the "surface" of the porous layer indicates a porous layer surface which is observable from directly above the porous layer by using an SEM.

(1): A step in which (i) a laminated body obtained by providing a porous layer on a base material is subjected to SEM surface observation (observation of a reflected electron image), which is carried out on a porous layer side from directly above the porous layer of the laminated body, with use of a field emission scanning electrode microscope JSM-7600F manufactured by Jeol Ltd. at an acceleration voltage of 5 kV, and (ii) an SEM image is thereby obtained.

(2): A step in which (i) an OHP film is placed on the SEM image obtained in the step (1), (ii) then, a projection image is prepared by tracing, onto the OHP film, outlines of filler particles (particles of the inorganic filler) in the SEM image, and (iii) thereafter, a photo of the projection image is taken by a digital still camera.

(3): A step in which (i) data of the photo obtained in the step (2) is imported into a computer, and (ii) then, an aspect ratio of each of 100 particles of the filler particles is calculated by using free software IMAGEJ (provided by NIH: National Institutes of Health) for image analysis. Note that the aspect ratio is a value obtained by (i) approximating the shape of each particle of the filler particles to an elliptical shape, (ii) calculating a long-axis diameter and a short-axis diameter of the elliptical shape, and (iii) dividing the long-axis diameter by the short-axis diameter.

(4): A step in which (i) thus calculated aspect ratios obtained in the step (3) from the projection image of each of the 100 particles of the filler particles are averaged. Thus obtained average value is defined as an aspect ratio of the projection image of the inorganic filler at a porous layer surface.

The aspect ratio of a projection image of the inorganic filler at the porous layer surface is an indicator of uniformity of a distribution of the inorganic filler in the porous layer, or particularly uniformity of a distribution of the inorganic filler at the porous layer surface. In a case where the aspect ratio is close to 1, the shape and the distribution of constituents at the porous layer surface are uniform and the particles of the inorganic filler are therefore densely-packed. In contrast, in a case where the aspect ratio is large, constituents of a surface structure of the porous layer is not uniformly provided. This indicates that the shape and the distribution of openings at the porous layer surface are less uniform.

In a case where the aspect ratio is greater than 4.0, the shape and the distribution of the porous layer, or in particular, the shape and the distribution of the openings at the surface of the porous layer are excessively decreased in uniformity. Then, this decrease in uniformity is considered to produce, in a nonaqueous electrolyte secondary battery including such a porous layer, portions where an electrolyte acceptance capacity of the porous layer during operation of the nonaqueous electrolyte secondary battery is decreased. In this case, a rate characteristic of the nonaqueous electrolyte secondary battery is considered to decrease consequently. In contrast, in a case where the aspect ratio is less than 1.4, the distribution of the inorganic filler in the porous layer, or in particular, the distribution of the inorganic filler at the surface of the porous layer is excessively uniform. Then, it is considered that this excessively uniform distribution results in a smaller area of the openings at the surface of the porous layer, so that in a nonaqueous electrolyte secondary battery including such a porous layer, an electrolyte acceptance capacity of the porous layer during operation of the nonaqueous electrolyte secondary battery is decreased. In this case, a rate characteristic of the nonaqueous electrolyte secondary battery is considered to decrease consequently.

<Degree of Orientation of Porous Layer>

The porous layer in accordance with an embodiment of the present invention is arranged such that: respective peak intensities $I_{(hkl)}$ and $I_{(abc)}$ of any diffraction planes (hkl) and (abc) of the porous layer satisfy the following Formula (1), the peak intensities being obtained from the diffraction planes (hkl) and (abc) orthogonal to each other by measurement by use of a wide-angle X-ray diffraction method; and a maximum value of a peak intensity ratio is in a range of 1.5 to 300 and more preferably in a range of 1.5 to 250, the peak intensity ratio being calculated by the following Formula (2):

$$I_{(hkl)} > I_{(abc)} \qquad (1), \text{ and}$$

$$I_{(hkl)}/I_{(abc)} \qquad (2).$$

In the description of the present application, the maximum value of a peak intensity ratio, which is calculated by the above Formula (2), is hereinafter referred to as a "degree of orientation of the porous layer".

A method of measuring the peak intensities $I_{(hkl)}$ and $I_{(abc)}$ and the ratio $I_{(hkl)}/I_{(abc)}$ of the peak intensities is not limited to a particular one. For example, the method can be a method including the following steps (1) to (3) below.

(1): A step in which a measurement sample is prepared by cutting out a 2-cm-square piece from a laminated body (laminated porous film) obtained by providing a porous layer on a base material.

(2) A step in which (i) the measurement sample obtained in the step (1) is attached to an Al holder such that a porous layer side of the measurement sample will be a measurement surface, and (ii) the measurement sample is subjected to measurement of an X-ray profile according to a wide-angle X-ray diffraction method (2θ-θ scanning method), in which measurement the porous layer side of the measurement sample serves as a measurement surface. Note that an apparatus and conditions for such measurement of the X-ray profile is not particularly limited. For example, the apparatus can be an apparatus RU-200R (rotating anticathode type) manufactured by Rigaku Corporation and the measurement can be carried out by using a CuKα X-ray as an X-ray source, at an output of 50 KV-200 mA, and at a scanning speed of 2°/min.

(3) A step in which (i) on the basis of the X-ray profile obtained in the step (2), a peak intensity ratio is calculated by the Formula (2) below for a case where the Formula (1) below is satisfied by peak intensities $I_{(hkl)}$ and $I_{(abc)}$ of any diffraction planes (hkl) and (abc) orthogonal to each other in measurement by a wide-angle X-ray diffraction of the porous layer; and (ii) then, a maximum value of the peak intensity ratio, that is, a degree of orientation of the porous layer is calculated:

$$I_{(hkl)} > I_{(abc)} \qquad (1), \text{ and}$$

$$I_{(hkl)}/I_{(abc)} \qquad (2).$$

Note that in such calculation of the degree of orientation of the porous layer, it is important to use diffraction planes orthogonal to each other and to thereby define both of a degree of orientation in a horizontal direction and a degree of orientation in a normal direction relative to a surface of a porous base material.

The maximum value of the peak intensity ratio (degree of orientation of the porous layer) expressed by the above Formula (2) is an indicator of a degree of orientation (orientation state) inside the porous layer. In a case where the peak intensity ratio, which is expressed by the above Formula (2), is small, the degree of orientation of an internal structure of the porous layer is low. In a case where the peak intensity ratio, which is expressed by the above Formula (2), is large, the degree of orientation in an internal structure of the porous layer is high.

In a case where the maximum value of the peak intensity ratio, which is expressed by the above Formula (2), is greater than 300, the internal structure of the porous layer has an excessively high anisotropy. Then, such an internal structure is considered to lead to a longer length of a flow path through which ions permeate the porous layer. It is considered that the longer length of the flow path results in a larger resistance of the porous layer to ion permeation in a nonaqueous electrolyte secondary battery including such a porous layer, so that a rate characteristic of the nonaqueous electrolyte secondary battery decreases.

Meanwhile, in a case where the maximum value of the peak intensity ratio, which is expressed by the above Formula (2), is less than 1.5, the following is considered. That is, in such a case, ions supplied by an electrode are caused to permeate, at a higher rate, the porous layer whose maximum value of the peak intensity ratio is less than 1.5 as compared to the porous layer whose maximum value of the peak intensity ratio is not less than 1.5. Then, the supply of ions from the electrode controls a rate of reaction within the nonaqueous electrolyte secondary battery (in other words, depletion of ions occurs at a surface of the electrode). This decreases a limiting current that is a condition of a current value in battery operation. As a result, the rate characteristic of the nonaqueous electrolyte secondary battery decreases.

<Method of Producing Porous Layer>

A method of producing the porous layer in accordance with an embodiment of the present invention is not limited to a particular one. The method can be, for example, a method according to which a porous layer containing the above-described inorganic filler and the above-described resin are formed on a base material by using any of the following processes (1) to (3). In a case where the following process (2) or (3) is used, a porous layer may be produced by drying a deposited resin for removal of a solvent. In a coating solution used in each of the processes (1) to (3), the inorganic filler may be dispersed and the resin may be dissolved. The base material is not limited to a particular one. The base material can be, for example, (i) a porous base material which contains a polyolefin as a main component and which serves as a porous base material of a nonaqueous electrolyte secondary battery laminated separator (described later) in accordance with an embodiment of the present invention or (ii) an electrode sheet.

(1) A process in which (i) a surface of a base material is coated with a coating solution, which is to form the porous layer and contains fine particles of the above-described inorganic filler and of the above-described resin, and then (ii) the surface of the base material is dried for removal of a solvent (dispersion medium) from the coating solution, so that the porous layer is formed.

(2) A process in which (i) a surface of the base material is coated with a coating solution, which is to form the porous layer and contains the above-described inorganic filler and the above-described resin, and then (ii) the base material is immersed into a deposition solvent (which is a poor solvent for the above resin) so that the porous layer is formed by deposition of the resin.

(3) A process in which (i) a surface of the base material is coated with a coating solution, which is to form the porous layer and contains the above-described inorganic filler and the above-described resin, and then (ii) the coating solution is made acidic with use of a low-boiling-point organic acid so that the porous layer is formed by deposition of the resin.

The solvent (dispersion medium) in the coating solution is not limited to a particular one. The solvent may be any solvent that does not adversely affect the base material, that allows the resin to be dissolved or dispersed therein uniformly and stably, and that allows the inorganic filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the resin contained in the coating solution. The solvent (dispersion medium) can be efficiently removed from the coating solution by (i) immersing, in the solvent X, the base material to which the coating solution has been applied and on which a coating film has been formed, for replacing, with the solvent X, the solvent (dispersion medium) in the coating film on the base material or a support and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

In view of adhesiveness of the porous layer to an electrode (electrode sheet) and ion permeability of the porous layer, a coating amount (weight per unit area) of the porous layer (per single porous layer) is, typically, preferably 0.5 g/m$^2$ to 20 g/m$^2$, and more preferably 0.5 g/m$^2$ to 10 g/m$^2$, in terms of solid content. This means that an amount of the coating solution to be applied to the base material is preferably adjusted so that the porous layer to be produced will have a coating amount (weight per unit area) within the above range.

In any of the processes (1) to (3), changing the amount of resin for a porous layer which resin is to be dissolved or dispersed in a solution can adjust the volume of resin that is contained per square meter of a porous layer having undergone immersion in an electrolyte and that has absorbed the electrolyte.

Further, changing the amount of solvent in which the resin for the porous layer is to be dissolved or dispersed can adjust the porosity and average pore diameter of a porous layer having undergone immersion in an electrolyte.

Further, an orientation state of the porous layer in accordance with an embodiment of the present invention, that is, an "aspect ratio of a projection image of an inorganic filler at a porous layer surface" and a "degree of orientation of the porous layer" can be controlled by regulating, as below, (i) a solid content concentration of a coating solution which is to be used in production of the porous layer and which contains the inorganic filler and the resin and (ii) a coating shear rate at the time when a base material is coated with the coating solution.

A suitable solid content concentration of the coating solution may vary depending on kinds of the inorganic filler, but generally, the solid content concentration is preferably higher than 20% by weight and not higher than 40% by weight. In a case where the solid content concentration is within the above range, the viscosity of the coating solution is kept appropriate. This consequently makes it possible to control the above "aspect ratio of a projection image of an inorganic filler at a porous layer surface" and the "degree of orientation of the porous layer" so that the above "aspect ratio of a projection image of an inorganic filler at a porous layer surface" and the "degree of orientation of the porous layer" will be within the above preferred ranges, respectively. The solid content concentration in the above range is therefore preferable.

When the base material is coated with the coating solution, the coating shear rate may vary depending on kinds of the inorganic filler. Generally, the coating shear rate is preferably not lower than 2 (1/s) and more preferably in a range of 4 (1/s) to 50 (1/s).

Assume here, for example, a case where the inorganic filler is an inorganic filler having any of shapes, such as a peanut-like shape and/or a tetrapod-like shape, which are formed by thermal fusion bonding of individual particles having a spherical shape or a pillar shape, a spherical shape, an elliptical shape, a plate shape, a bar shape, and an indefinite irregular shape. In this case, a high shear force is applied to the inorganic filler when the coating shear rate is increased. This tends to cause the inorganic filler to have a higher anisotropy. In contrast, in a case where the coating shear rate is decreased, no shear force is applied to the inorganic filler. This tends to cause the inorganic filler to be isotropically oriented.

On the other hand, in a case where the inorganic filler is made of a long-fiber-diameter inorganic filler, such as a long-fiber-diameter wollastonite, long fibers tangle with each other or long fibers are caught on a blade portion of a doctor blade when the coating shear rate is higher. This causes the inorganic filler to be randomly oriented, so that the inorganic filler has a low anisotropy. In contrast, long fibers do not tangle with each other or are not caught on a blade portion of a doctor blade when the coating shear rate is lower. Accordingly, when the coating shear rate is lower, long fibers do not tangle with each other or are not caught on a blade portion of a doctor blade. This causes the inorganic filler to be easily oriented, so that the inorganic filler tends to have a high anisotropy.

Embodiment 2: Nonaqueous Electrolyte Secondary Battery Laminated Separator

A nonaqueous electrolyte secondary battery laminated separator in accordance with Embodiment 2 of the present invention includes: a porous base material containing a polyolefin as a main component; and a nonaqueous electrolyte secondary battery insulating porous layer in accordance with Embodiment 1 of the present invention, the nonaqueous electrolyte secondary battery insulating porous layer being provided on one surface or both surfaces of the porous layer.

<Porous Base Material>

The porous base material in accordance with an embodiment of the present invention can be a base material for a nonaqueous electrolyte secondary battery laminated separator in accordance with an embodiment of the present invention. The porous base material contains a polyolefin-based resin as a main component. The polyolefin porous film has therein many pores, connected to one another, so that a gas and/or a liquid can pass through the porous base material from one side to the other side. The porous base material may include a single layer or a plurality of layers provided so as to form a laminate.

The expression that the porous base material "contains a polyolefin-based resin as a main component" means that a polyolefin-based resin accounts for not less than 50% by volume, preferably not less than 90% by volume, and more preferably not less than 95% by volume, of the entire porous base material. The polyolefin-based resin more preferably contains a high molecular weight component having a weight-average molecular weight of $3 \times 10^5$ to $15 \times 10^6$. In particular, the polyolefin more preferably contains a high molecular weight component having a weight-average molecular weight of not less than 1,000,000. This is because in a case where the nonaqueous electrolyte secondary battery laminated separator in accordance with an embodiment of the present invention is a laminated body formed by providing the nonaqueous electrolyte secondary battery insulating porous layer in accordance with an embodiment of the present invention on one surface or both surfaces of the porous base material, the nonaqueous electrolyte secondary battery laminated separator has an enhanced strength.

Examples of the polyolefin-based resin which is a main component of the porous base material include, but are not particularly limited to, homopolymers (for example, polyethylene, polypropylene, and polybutene) and copolymers (for example, ethylene-propylene copolymer), which are produced through (co)polymerization of a monomer such as ethylene, propylene, 1-butene, 4-methyl-1-pentene, and 1-hexene (which are thermoplastic resins). Among these, polyethylene is preferable as it is capable of preventing (shutting down) a flow of an excessively large electric current at a lower temperature. Examples of the polyethylene include a low-density polyethylene, a high-density polyethylene, a linear polyethylene (an ethylene-α-olefin copolymer), and an ultra-high molecular weight polyethylene having a weight-average molecular weight of not less than 1,000,000. Among these examples, the polyethylene is more preferably a high molecular weight polyethylene having a weight-average molecular weight of 300,000 to 1,000,000 or an ultra-high molecular weight polyethylene having a weight-average molecular weight of not less than 1,000,000. Concrete examples of the polyolefin-based resin encompass a polyolefin-based resin made of a mixture of (i) a polyolefin having a weight-average molecular weight of not less than 1,000,000 and (ii) a low molecular weight polyolefin having a weight-average molecular weight of not greater than 10,000.

A film thickness of the porous base material may be set as appropriate in view of a film thickness of a laminated body that is the nonaqueous electrolyte secondary battery laminated separator in accordance with an embodiment of the present invention. The film thickness of the laminated body is preferably 4 μm to 40 μm (per single porous layer) and more preferably 5 μm to 20 μm (per single porous layer).

It is preferable that the porous base material have a film thickness of not less than 4 μm (per single porous layer). This is because, in a nonaqueous electrolyte secondary battery including a nonaqueous electrolyte secondary battery laminated separator using the porous base material having a film thickness of not less than 4 μm, it is possible to sufficiently prevent an internal short circuit that might occur due to, for example, breakage of the nonaqueous electrolyte secondary battery. On the other hand, the porous base material preferably has a film thickness of not greater than 40 μm (per single porous layer). This is because, with such a film thickness, (i) it is possible to prevent an increase in resistance to lithium ion permeation all over the nonaqueous electrolyte secondary battery laminated separator which includes the porous base material, (ii) it is possible to prevent a positive electrode from deteriorating and also to prevent a rate characteristic and a cycle characteristic from decreasing in a case where a charge-discharge cycle is repeated, in a nonaqueous electrolyte secondary battery including the nonaqueous electrolyte secondary battery laminated separator, and (iii) it is possible to prevent an increase in size of the nonaqueous electrolyte secondary battery itself in a case where a distance between the positive electrode and a negative electrode increases.

The porous base material has a weight per unit area which weight may be set as appropriate, in view of strength, a film thickness, a weight, and handleability of the nonaqueous electrolyte secondary battery laminated separator including the porous base material. Specifically, the weight per unit area of the porous base material is typically, preferably 4 g/m$^2$ to 20 g/m$^2$ (per single porous layer), and more preferably 5 g/m$^2$ to 12 g/m$^2$ (per single porous layer), so as to allow the nonaqueous electrolyte secondary battery including the nonaqueous electrolyte secondary battery laminated separator to have a higher weight energy density and a higher volume energy density.

The porous base material has an air permeability of preferably 30 sec/100 mL to 500 sec/100 mL, and more preferably 50 sec/100 mL to 300 sec/100 mL, in terms of Gurley values. A porous base material having such an air permeability allows a nonaqueous electrolyte secondary battery laminated separator including the porous base material to achieve sufficient ion permeability.

The porous base material has a porosity of preferably 20% by volume to 80% by volume, and more preferably 30% by volume to 75% by volume, so as to (i) retain a larger amount of electrolyte and (ii) have the function of reliably preventing (shutting down) a flow of an excessively large electric current at a lower temperature. It is preferable that the porous base material have a porosity of not less than 20% by volume. This is because such a porosity makes it possible to reduce resistance to ion permeation. Meanwhile, in view of a mechanical strength of the porous base material, the porosity of the porous base material is preferably not greater than 80% by volume.

The porous base material has a pore size of preferably not greater than 0.3 μm, and more preferably not greater than 0.14 µm, so that the nonaqueous electrolyte secondary battery laminated separator including the porous base material can have sufficient ion permeability and prevent particles from entering the positive electrode and the negative electrode.

The porous base material may be arranged, as necessary, such that another porous layer other than the porous layer in accordance with Embodiment 1 of the present invention is formed on the porous base material. Examples of such another porous layer include publicly known porous layers such as a heat-resistant layer, an adhesive layer, and a protective layer. Specific examples of such another porous layer include a porous layer identical in composition to the porous layer in accordance with Embodiment 1 of the present invention.

[Method of Producing Porous Base Material]

A method of producing a porous base material is not limited to a particular one, and can be, for example, a method including the steps of first adding a pore forming agent to a resin such as a polyolefin to form a film (forming the resin into a film), and then removing the pore forming agent with use of an appropriate solvent.

Specifically, in a case where, for example, the porous base material is made of a polyolefin resin containing an ultra-high molecular weight polyethylene and a low molecular weight polyolefin which has a weight-average molecular weight of not greater than 10,000, the porous base material is preferably produced by, in view of production costs, a method including the following steps (1) to (4):

(1) kneading 100 parts by weight of the ultra-high molecular weight polyethylene, 5 parts by weight to 200 parts by weight of the low molecular weight polyolefin having a weight-average molecular weight of not greater than 10,000, and 100 parts by weight to 400 parts by weight of a pore forming agent, so that a polyolefin resin composition is obtained;
(2) forming the polyolefin resin composition into a sheet by rolling;
(3) following the step (2), removing the pore forming agent from the sheet having been obtained by rolling in the step (2);
(4) stretching the sheet from which the pore forming agent has been removed in the step (3); and
(5) heat fixing the sheet having been stretched in the step (4) at a heat-fixation temperature of not lower than 100° C. and not higher than 150° C., so that the porous base material is obtained.

Alternatively, the method includes the following steps:
(3') stretching the sheet obtained by rolling in the step (2).
(4') removing the pore forming agent from the sheet having been stretched in the step (3'); and
(5') heat fixing the sheet having been obtained in the step (4') at a heat-fixation temperature of not lower than 100° C. and not higher than 150° C., so that the porous base material is obtained.

Examples of the pore forming agent encompass a plasticizer and a bulking agent which is made of an inorganic material.

Examples of the bulking agent which is made of an inorganic material include, but are not particularly limited to, an inorganic filler. Examples of the plasticizing agent include, but are not particularly limited to, a low molecular weight hydrocarbon such as liquid paraffin.

<Method of Producing Nonaqueous Electrolyte Secondary Battery Laminated Separator>

The nonaqueous electrolyte secondary battery laminated separator in accordance with an embodiment of the present invention can be produced by, for example, a method in which the above porous base material is used as a base material to be coated with the coating solution in the above-described "Method of producing porous layer".

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention is obtained by arranging a positive electrode, a porous layer in accordance with Embodiment 1 of the present invention or a nonaqueous electrolyte secondary battery laminated separator in accordance with Embodiment 2 of the present invention, and a negative electrode, the positive electrode, the porous layer or the nonaqueous electrolyte secondary battery laminated separator, and the negative electrode being provided in this order.

A nonaqueous electrolyte secondary battery in accordance with Embodiment 4 of the present invention includes (i) a porous layer in accordance with Embodiment 1 of the present invention or (ii) a nonaqueous electrolyte secondary battery laminated separator in accordance with Embodiment 2 of the present invention.

The nonaqueous electrolyte secondary battery in accordance with an embodiment of the present invention is, for example, a nonaqueous secondary battery that achieves an electromotive force through doping with and dedoping of lithium, and is a lithium-ion secondary battery that includes a nonaqueous electrolyte secondary battery member including a positive electrode, a porous layer in accordance with an embodiment of the present invention, a porous base material, and a negative electrode, which are provided in this order, that is, a lithium-ion secondary battery that includes a positive electrode, a nonaqueous electrolyte secondary battery laminated separator in accordance with an embodiment of the present invention, and a negative electrode, which are provided in this order. Note that components of the nonaqueous electrolyte secondary battery other than the porous layer are not limited to those described below.

The nonaqueous electrolyte secondary battery in accordance with an embodiment of the present invention is typically arranged such that a battery element is enclosed in an exterior member, the battery element including (i) a structure in which the negative electrode and the positive electrode face each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

The nonaqueous electrolyte secondary battery member in accordance with an embodiment of the present invention includes the porous layer in accordance with an embodiment of the present invention whose degree of orientation is suitably controlled. Accordingly, a nonaqueous electrolyte secondary battery incorporating the nonaqueous electrolyte secondary battery member can advantageously have an improved discharge output characteristic (rate characteristic). Further, since the nonaqueous electrolyte secondary battery in accordance with an embodiment of the present invention includes the porous layer in accordance with an embodiment of the present invention whose degree of orientation is suitably controlled, the nonaqueous electrolyte secondary battery advantageously has an excellent discharge output characteristic (rate characteristic).

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent and/or a binding agent.

The positive electrode active material is, for example, a material capable of being doped with and dedoped of lithium ions. Specific examples of such a material encompass a lithium complex oxide containing at least one transition metal such as V, Mn, Fe, Co, or Ni. Among such lithium complex oxides, (i) a lithium complex oxide having an $\alpha$-NaFeO$_2$ structure, such as lithium nickel oxide or lithium cobalt oxide, and (ii) a lithium complex oxide having a spinel structure, such as lithium manganese spinel, are preferable because such lithium complex oxides have a high average discharge potential. The lithium complex oxide may further contain any of various metal elements, and is more preferably a lithium nickel complex oxide.

Further, the lithium nickel complex oxide still more preferably contains at least one metal element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metal element and the number of moles of Ni in the lithium nickel oxide. This is because such a complex lithium nickel oxide leads to an excellent cycle characteristic when used in a high-capacity battery. Among others, an active material that contains Al or Mn and that further contains Ni at a proportion of not less than 85%, and more preferably not less than 90%, is particularly preferable. This is because when a positive electrode containing such an active material is used in a nonaqueous electrolyte secondary battery for use as a high-capacity battery, that nonaqueous electrolyte secondary battery has an excellent cycle characteristic.

Examples of the electrically conductive agent include carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, a thermoplastic polyimide, polyethylene, and polypropylene; acrylic resin; and styrene-butadiene-rubber. Note that the binding agent also functions as a thickener.

Examples of a method of preparing a positive electrode mix encompasses: a method in which pressure is applied to the positive electrode active material, the electrically conductive agent, and the binding agent on a positive electrode current collector; and a method in which an appropriate organic solvent is used so that the positive electrode active material, the electrically conductive material, and the binding agent will be in a paste form.

Examples of the positive electrode current collector encompass electric conductors such as Al, Ni, and stainless steel. Among these, Al is preferable because Al is easily processed into a thin film and is inexpensive.

The positive electrode sheet may be produced, that is, the positive electrode mix may be supported by the positive electrode current collector, by for example, a method in which pressure is applied to the positive electrode active material, the electrically conductive agent, and the binding agent on the positive electrode current collector to form a positive electrode mix thereon or a method in which (i) an appropriate organic solvent is used so that the positive electrode active material, the electrically conductive agent, and the binding agent will be in a paste form to provide a positive electrode mix, (ii) the positive electrode mix is applied to the positive electrode current collector, (iii) the applied positive electrode mix is dried so that a sheet-shaped positive electrode mix is prepared, and (iv) then pressure is applied to the sheet-shaped positive electrode mix so that the sheet-shaped positive electrode mix is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent and/or a binding agent.

Examples of the negative electrode active material encompass (i) a material capable of being doped with and dedoped of lithium ions, (ii) lithium metal, and (iii) lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped with and dedoped of lithium ions at an electric potential lower than that for the positive electrode; metals such as aluminum (Al), lead (Pb), tin (Sn), bismuth (Bi), or silicon (Si), each of which is alloyed with alkali metal; cubic intermetallic compounds (AlSb, Mg$_2$Si, and NiSi$_2$) having lattice spaces in which alkali metals can be provided; and lithium nitrogen compounds (Li$_{3-x}$M$_x$N (where M represents a transition metal)). Among the above negative electrode active materials, a carbonaceous material that contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the positive electrode. The negative electrode active material may alternatively be a mixture of graphite and silicon, preferably containing Si at a proportion of not less than 5%, and more preferably not less than 10%, with respect to carbon (C) constituting the graphite.

The negative electrode mix may be prepared by, for example, a method in which pressure is applied to the negative electrode active material on a negative electrode current collector or a method in which an appropriate organic solvent is used so that the negative electrode active material will be in a paste form.

The negative electrode current collector is, for example, Cu, Ni, or stainless steel. Among these, Cu is preferable as it is not easily alloyed with lithium in the case of a lithium-ion secondary battery in particular and is easily processed into a thin film.

The negative electrode sheet may be produced, that is, the negative electrode mix may be supported by the negative electrode current collector by, for example, a method in which pressure is applied to the negative electrode active material on the negative electrode current collector to form a negative electrode mix thereon or a method in which (i) an appropriate organic solvent is used so that the negative electrode active material will be in a paste form to provide a negative electrode mix, (ii) the negative electrode mix is applied to the negative electrode current collector, (iii) the applied negative electrode mix is dried so that a sheet-shaped negative electrode mix is prepared, and (iv) then pressure is applied to the sheet-shaped negative electrode mix so that the sheet-shaped negative electrode mix is firmly fixed to the negative electrode current collector. The above paste preferably includes the above electrically conductive agent and the binding agent.

<Nonaqueous Electrolyte>

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte include a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte for an embodiment of the present invention include: carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methyl ether, 2,2,3,3-tetrafluoropropyl difluoro methyl ether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into any of the organic solvents described above. It is possible to use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is still more preferably a mixed solvent of ethylene carbonate, dimethyl carbonate, and ethyl methyl carbonate. This is because such a mixed solvent leads to a wider operating temperature range, and is not easily decomposed even in a case where a negative electrode active material is a graphite material such as natural graphite or artificial graphite.

<Method of Producing Nonaqueous Electrolyte Secondary Battery Member and Method of Producing Nonaqueous Electrolyte Secondary Battery>

A nonaqueous electrolyte secondary battery member in accordance with an embodiment of the present invention can be produced by, for example, arranging a positive electrode, a porous layer in accordance with an embodiment of the present invention or a nonaqueous electrolyte secondary battery laminated separator in accordance with an embodiment of the present invention, and an negative electrode in this order.

A nonaqueous electrolyte secondary battery in accordance with an embodiment of the present invention can be produced by, for example, (i) producing a nonaqueous electrolyte secondary battery member as described above, (ii) inserting the nonaqueous electrolyte secondary battery member into a container that will serve as a housing of a nonaqueous electrolyte secondary battery, (iii) filling the container with a nonaqueous electrolyte, and (iv) hermetically sealing the container while reducing pressure inside the container.

The nonaqueous electrolyte secondary battery is not particularly limited in shape and may have any shape such as the shape of a thin plate (sheet), a disk, a cylinder, or a prism such as a cuboid. The nonaqueous electrolyte secondary battery member and the nonaqueous electrolyte secondary battery may each be produced by any method, and may each be produced by a conventionally publicly known method.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss embodiments of the present invention in greater detail with reference to Examples and Comparative Examples. Note, however, that the present invention is not limited to the following Examples and Comparative Examples.

[Measurement]

The following methods were used for measurement of physical properties and the like of an A layer (porous base material), a B layer (porous layer), and a laminated porous film (laminated separator) employing the A layer and the B layer, which were produced in each of Examples 1 to 5 and Comparative Examples 1 to 6, and for measurement of a rate characteristic of a nonaqueous electrolyte secondary battery including the laminated separator.

(1) Measurement of Aspect Ratio of Projection Image of Inorganic Filler at Porous Layer Surface A laminated porous film produced in each of Examples 1 to 5 and Comparative Examples 1 to 6 was subjected to SEM surface observation (observation of a reflected electron image) which was carried out on a side where the porous layer (B layer) was present. The SEM surface observation was carried out at an acceleration voltage of 5 kV by use of a field emission scanning electrode microscope JSM-7600F manufactured by Jeol Ltd., so that an electron micrograph (SEM image) was obtained. In the SEM image thus obtained, an OHP film was placed. Then, a projection image was prepared by tracing, onto the OHP film, outlines of filler particles (particles of an inorganic filler) in the SEM image.

Thereafter, a photo of the projection image was taken by a digital still camera. Then, data of the photo thus obtained was imported into a computer, and an aspect ratio of each of 100 particles of the filler particles was calculated by using free software IMAGEJ (provided by NIH: National Institutes of Health) for image analysis. Then, an average of thus calculated aspect ratios was defined as an aspect ratio of the projection image of the inorganic filler at a surface of the porous layer (B layer) (hereinafter, the aspect ratio is also referred to as a surface filler aspect ratio). Here, the shape of each particle of the filler particles was approximated to an elliptical shape. Further, a long-axis diameter of the elliptical shape and a short-axis diameter of the elliptical shape were calculated. Then, a value obtained by dividing the long-axis diameter of the elliptical shape by the short-axis diameter of the elliptical shape was defined as an aspect ratio of each particle of the filler.

(2) Measurement of Degree of Orientation of Porous Layer

A measurement sample was prepared by cutting out a 2-cm-square piece from the laminated porous film produced in each of Examples 1 to 5 and Comparative Examples 1 through 6. The measurement sample thus obtained was attached to an Al holder such that the porous layer (B layer) of the measurement sample would be a measurement surface. Then, the measurement sample was subjected to measurement of an X-ray profile according to a wide-angle X-ray diffraction method (2θ-θ scanning method). In this measurement, the porous layer (B layer) of the measurement sample served as a measurement surface. Regarding an apparatus and conditions for the measurement, the apparatus was an apparatus RU-200R (rotating anticathode type) manufactured by Rigaku Corporation and the measurement was carried out by using a CuKα X-ray as an X-ray source, at an output of 50 KV-200 mA, and at a scanning speed of 2°/min. Next, a peak intensity ratio was calculated by the Formula (2) below for a case where the Formula (1) below was satisfied by peak intensities $I_{(hkl)}$ and $I_{(abc)}$ of any diffraction planes (hkl) and (abc) orthogonal to each other in measurement of the B layer by a wide-angle X-ray diffraction; and then, a maximum value of the peak intensity ratio, that is, a degree of orientation of the porous layer (B layer) was calculated:

$$I_{(hkl)} > I_{(abc)} \quad (1), \text{ and}$$

$$I_{(hkl)}/I_{(abc)} \quad (2).$$

(3) Volume-Based Particle Size Distribution of Inorganic Filler

In order to calculate a volume-based particle size distribution of the inorganic filler, D10, D50 and D90 were measured with use of a laser diffraction particle size analyzer (manufactured by Shimadzu Corporation; product name: SALD2200). Here, D50 means a particle diameter in a case where a volume-based cumulative distribution is 50%, D10 means a particle diameter in a case where the volume-based cumulative distribution is 10%, and D90 means a particle diameter in a case where the volume-based cumulative distribution is 90%.

(4) BET Specific Surface Area of Inorganic Filler

In order to obtain a BET specific surface area of the inorganic filler, a nitrogen adsorption-desorption isotherm was obtained by measurement according to a constant volume method and then, the BET specific surface area was calculated by a BET method.

(5) Method of Measuring Rate Characteristic

The nonaqueous electrolyte secondary battery produced in each of Examples 1 to 5 and Comparative Examples 1 to 6 was first subjected to each of four cycles of initial charge and discharge at 25° C., at a voltage ranging from 4.1 V to 2.7 V, and at an electric current value of 0.2 C (note that 1 C is an electric current value at which a battery rated capacity derived from a one-hour rate discharge capacity was discharged in one hour, and this applies to the following descriptions).

Thereafter, the nonaqueous electrolyte secondary battery that had been subjected to the initial charge and discharge was subjected to (i) three cycles of charge and discharge at a constant charge electric current value of 1 C and a constant discharge electric current value of 0.2 C at 55° C., and (ii) three cycles of charge and discharge at a constant charge electric current value of 1 C and a constant discharge electric current value of 20 C at 55° C.

Then, a discharge capacity was measured (i) at the third cycle of the charge and discharge at the constant discharge electric current value of 0.2 C (hereinafter, referred to as a 0.2 C discharge capacity) and (ii) at the third cycle of the charge and discharge at the constant discharge electric current value of 20 C (hereinafter, referred to as a 20 C discharge capacity). Then, the ratio of the 20 C discharge capacity to the 0.2 C discharge capacity (20 C discharge capacity/0.2 C discharge capacity)×100 was calculated and defined as the rate characteristic (%).

Example 1

[Method of Preparing Porous Layer and Laminated Porous Film]

<Porous Base Material (A Layer)>

A porous base material was prepared by using polyethylene that is a polyolefin.

That is, 70 parts by weight of an ultra-high molecular weight polyethylene powder (340M, manufactured by Mitsui Chemicals, Inc.) and 30 parts by weight of a polyethylene wax (FNP-0115, manufactured by Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added. Then, calcium carbonate (manufactured by Maruo Calcium Co., Ltd.) having an average particle diameter of 0.1 μm was further added so that the calcium carbonate accounted for 38% by volume of the total volume. Then, the above composition in powder form was mixed by a Henschel mixer, and was then melt-kneaded by a twin screw kneading extruder. As a result, a polyethylene resin composition was obtained. Next, the polyethylene resin composition was rolled with use of a pair of rollers each having a surface temperature of 150° C., so that a sheet was produced. This sheet was immersed in an aqueous hydrochloric acid solution (in which 4 mol/L of hydrochloric acid and 0.5% by weight of nonionic surfactant were mixed), so that the calcium carbonate was dissolved into this solution and removed from the sheet. Subsequently, the sheet was stretched at 105° C. at a stretch ratio of 6 times, so that a porous base material (A layer) made of polyethylene was prepared. The porous base material had a porosity of 53%, a weight per unit area of 7 g/m$^2$, and a film thickness of 16 μm.

<Porous Layer (B Layer)>
(Preparation of Coating Solution)

As the inorganic filler, a hexagonal plate-shaped zinc oxide (manufactured by Sakai Chemical Industry Co., Ltd., product name: XZ-100F) (inorganic filler 1) was used. This hexagonal plate-shaped zinc oxide had an atomic mass percentage of oxygen of 20%.

Further, as a binder resin, a vinylidene fluoride-hexafluoropropylene copolymer (manufactured by Arkema Inc.; product name "KYNAR2801") (binder resin 1) was used.

With respect to 90 parts by weight of the inorganic filler 1, 10 parts by weight of the binder resin 1 was mixed, and also, a solvent (N-methyl-2-pyrrolidinone (solvent 1), manufactured by Kanto Chemical Co., Inc.) was mixed with the inorganic filler 1 and the binder resin 1 so that a solid content concentration (concentration of the inorganic filler 1 and the binder resin 1) of a resultant mixed solution was 37% by weight. The resultant mixed solution was stirred and mixed by a thin-film spin system high-speed mixer (FILMIX (Registered Trademark), manufactured by PRIMIX Corporation), so that a uniform coating solution (coating solution 1) was obtained.

(Production of Porous Layer and Laminated Porous Film)

The coating solution 1 thus obtained was applied to one surface of the A layer by a doctor blade method at a coating shear rate of 3.9 (1/s), so that a coating film was formed on that one surface of the A layer. Thereafter, the coating film was dried at 65° C. for 20 minutes, so that a porous layer (B layer) was formed on the one surface of the A layer. As a result, a laminated porous film 1 in which the B layer was provided on the one surface of the A layer was obtained. The B layer had a weight per unit area of 7 g/m$^2$ and a thickness of 4 μm.

<Preparation of Nonaqueous Electrolyte Secondary Battery>

The following method was used for preparing a nonaqueous electrolyte secondary battery 1 by using the laminated porous film 1 thus obtained.

(Positive Electrode)

A commercially available positive electrode was used that was produced by applying LiNi$_{0.5}$Mn$_{0.3}$Co$_{0.2}$O$_2$/electrically conductive agent/PVDF (weight ratio 92:5:3) to an aluminum foil. The aluminum foil was partially cut off so that a positive electrode active material layer was present in an area of 45 mm×30 mm and that that area was surrounded by an area with a width of 13 mm in which area no positive electrode active material layer was present. The cutoff was used as a positive electrode. The positive electrode active material layer had a thickness of 58 μm and a density of 2.50 g/cm$^3$. The positive electrode had a capacity of 174 mAh/g.

(Negative Electrode)

A commercially available negative electrode was used that was produced by applying graphite/styrene-1,3-butadiene copolymer/sodium carboxymethylcellulose (weight ratio 98:1:1) to a copper foil. The copper foil was partially cut off so that a negative electrode active material layer was present in an area of 50 mm×35 mm and that that area was surrounded by an area with a width of 13 mm in which area no negative electrode active material layer was present. The cutoff was used as a negative electrode. The negative electrode active material layer had a thickness of 49 μm and a density of 1.40 g/cm$^3$. The negative electrode had a capacity of 372 mAh/g.

(Preparation of Nonaqueous Electrolyte Secondary Battery)

In a laminate pouch, the positive electrode, the laminated porous film 1 (nonaqueous electrolyte secondary battery laminated separator), and the negative electrode were disposed (arranged to form a laminate) in this order so as to obtain a nonaqueous electrolyte secondary battery member. During this operation, the positive electrode and the negative electrode were arranged so that the positive electrode active material layer of the positive electrode had a main surface that was entirely covered by the main surface of the negative electrode active material layer of the negative electrode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving LiPF$_6$ in a mixed solvent of ethyl methyl carbonate, diethyl carbonate, and ethylene carbonate in a volume ratio of 50:20:30 so that the concentration of LiPF$_6$ in the electrolyte was 1.0 mole per liter. The bag was then heat-sealed while the pressure inside the bag was reduced. This produced a nonaqueous electrolyte secondary battery 1. The nonaqueous electrolyte secondary battery 1 had a design capacity of 20.5 mAh.

Example 2

Fused Zirkondioxid/Calciumoxid (ZrO$_2$/CaO=95/5) (manufactured by ceram BmGH) having an atomic mass percentage of oxygen of 26% was subjected to grinding for 4 hours by using an alumina pot having a capacity of 3.3 L and a 15 mmφ alumina ball in a vibrating mill. This produced an inorganic filler 2. The inorganic filler 2 was in the form of a solid solution formed as a result of melting of 95 parts by weight of ZrO$_2$ and 5 parts by weight of CaO.

A laminated porous film 2 was prepared as in Example 1 except that (i) the inorganic filler used in Example 1 for preparation of the porous layer (B layer) was replaced by the inorganic filler 2 and (ii) the coating shear rate in Example 1 was changed to a coating shear rate of 7.9 (1/s).

Further, a nonaqueous electrolyte secondary battery 2 was prepared by a method similar to a method of preparing the nonaqueous electrolyte secondary battery in Example 1 except that the laminated porous film 2 was used in place of the laminated porous film 1.

Example 3

An inorganic filler 3 was obtained by mixing, in a mortar, 99 parts by weight of α-alumina (manufactured by Sumitomo Chemical Co., Ltd.; product name: AKP3000) and 1 part by weight of a hexagonal plate-shaped zinc oxide (manufactured by Sakai Chemical Industry Co., Ltd., product name: XZ-1000F). The inorganic filler 3 had an atomic mass percentage of oxygen of 47%.

Then, with respect to 90 parts by weight of the inorganic filler 3, 10 parts by weight of the binder resin 1 was mixed, and also, the solvent 1 was mixed so that a solid content concentration (concentration of the inorganic filler 3 and the binder resin 1) of a resultant mixed solution was 40% by weight. As a result, a uniform coating solution (coating solution 2) was obtained.

Subsequently, a laminated porous film 3 was prepared as in Example 1 except that (i) the coating solution 1 was replaced by the coating solution 2 and (ii) the coating shear rate in Example 1 was changed to a coating shear rate of 39.4 (1/s).

Further, a nonaqueous electrolyte secondary battery 3 was prepared by a method similar to the method of preparing the nonaqueous electrolyte secondary battery in Example 1 except that the laminated porous film 3 was used in place of the laminated porous film 1.

Example 4

An inorganic filler 4 was obtained by mixing, in a mortar, 50 parts by weight of a spherical alumina (manufacture d by Sumitomo Chemical Co., Ltd.; product name: AA03) an d 50 parts by weight of a synthetic mica (manufactured by Wako Pure Chemical Industries, Ltd.; product name: non-s welling synthetic mica). The inorganic filler 4 had an atomic mass percentage of oxygen of 45%.

Then, with respect to 90 parts by weight of the inorganic filler 4, 10 parts by weight of the binder resin 1 was mixed, and also, the solvent 1 was mixed so that a solid content concentration (concentration of the inorganic filler 4 and the binder resin 1) of a resultant mixed solution was 30% by weight. The resultant mixed solution was stirred and mixed by a thin-film spin system high-speed mixer, so that a uniform coating solution (coating solution 3) was obtained.

Subsequently, a laminated porous film 4 was prepared as in Example 1 except that (i) the coating solution 1 was replaced by the coating solution 3 and (ii) the coating shear rate in Example 1 was changed to a coating shear rate of 7.9 (1/s).

Further, a nonaqueous electrolyte secondary battery 4 was prepared by a method similar to the method of preparing the nonaqueous electrolyte secondary battery in Example 1 except that the laminated porous film 4 was used in place of the laminated porous film 1.

Example 5

As the inorganic filler, wollastonite (manufactured by Hayashi-Kasei Co., Ltd.; product name: wollastonite VM-8N) (inorganic filler 5) having an atomic mass percentage of oxygen of 41% was used.

Then, with respect to 90 parts by weight of the inorganic filler 5, 10 parts by weight of the binder resin 1 was mixed, and also, the solvent 1 was mixed so that a solid content concentration (concentration of the inorganic filler 5 and the binder resin 1) of a resultant mixed solution was 40% by weight. The resultant mixed solution was stirred and mixed by a thin-film spin system high-speed mixer, so that a uniform coating solution (coating solution 4) was obtained.

Subsequently, a laminated porous film 5 was prepared as in Example 1 except that (i) the coating solution 1 was replaced by the coating solution 4 and (ii) the coating shear rate in Example 1 was changed to a coating shear rate of 7.9 (1/s).

Further, a nonaqueous electrolyte secondary battery 5 was prepared by a method similar to the method of preparing the nonaqueous electrolyte secondary battery in Example 1 except that the laminated porous film 5 was used in place of the laminated porous film 1.

Comparative Example 1

As the inorganic filler, borax (manufactured by Wako Pure Chemical Industries, Ltd.) having an atomic mass percentage of oxygen of 71% was used (inorganic filler 6).

Then, with respect to 90 parts by weight of the inorganic filler 6, 10 parts by weight of the binder resin 1 was mixed, and also, the solvent 1 was mixed so that a solid content concentration (concentration of the inorganic filler 6 and the binder resin 1) of a resultant mixed solution was 40% by weight. The resultant mixed solution was stirred and mixed by a thin-film spin system high-speed mixer, so that a uniform coating solution (coating solution 5) was obtained.

Subsequently, a laminated porous film 6 was prepared as in Example 1 except that (i) the coating solution 1 was replaced by the coating solution 5 and (ii) the coating shear rate in Example 1 was changed to a coating shear rate of 7.9 (1/s).

Further, a nonaqueous electrolyte secondary battery 6 was prepared by a method similar to the method of preparing the nonaqueous electrolyte secondary battery in Example 1 except that the laminated porous film 6 was used in place of the laminated porous film 1.

Comparative Example 2

As the inorganic filler, a hexagonal plate-shaped zinc oxide (manufactured by Sakai Chemical Industry Co., Ltd., product name: XZ-100F) having an atomic mass percentage of oxygen of 20% was used (inorganic filler 7).

Then, with respect to 90 parts by weight of the inorganic filler 7, 10 parts by weight of the binder resin 1 was mixed, and also, the solvent 1 was mixed so that a solid content concentration (concentration of the inorganic filler 7 and the binder resin 1) of a resultant mixed solution was 40% by weight. The resultant mixed solution was stirred and mixed by a thin-film spin system high-speed mixer, so that a uniform coating solution (coating solution 6) was obtained.

Subsequently, a laminated porous film 7 was prepared as in Example 1 except that (i) the coating solution 1 was replaced by the coating solution 6 and (ii) the coating shear rate in Example 1 was changed to a coating shear rate of 0.4 (1/s).

Further, a nonaqueous electrolyte secondary battery 7 was prepared by a method similar to the method of preparing the nonaqueous electrolyte secondary battery in Example 1 except that the laminated porous film 7 was used in place of the laminated porous film 1.

Comparative Example 3

As the inorganic filler, a spherical alumina (manufactured by Sumitomo Chemical Co., Ltd.; product name: AA03) having an atomic mass percentage of oxygen of 47% was used (inorganic filler 8).

Then, with respect to 90 parts by weight of the inorganic filler 8, 10 parts by weight of the binder resin 1 was mixed, and also, the solvent 1 was mixed so that a solid content concentration (concentration of the inorganic filler 8 and the binder resin 1) of a resultant mixed solution was 40% by weight. The resultant mixed solution was stirred and mixed by a thin-film spin system high-speed mixer, so that a uniform coating solution (coating solution 7) was obtained.

Subsequently, a laminated porous film 8 was prepared as in Example 1 except that (i) the coating solution 1 was replaced by the coating solution 7 and (ii) the coating shear rate in Example 1 was changed to a coating shear rate of 7.9 (1/s).

Further, a nonaqueous electrolyte secondary battery 8 was prepared by a method similar to the method of preparing the nonaqueous electrolyte secondary battery in Example 1 except that the laminated porous film 8 was used in place of the laminated porous film 1.

Comparative Example 4

As the inorganic filler, attapulgite (manufactured by Hayashi-Kasei Co., Ltd.; product name: ATTAGEL #50) having an atomic mass percentage of oxygen of 48% was used (inorganic filler 9).

Then, with respect to 90 parts by weight of the inorganic filler 9, 10 parts by weight of the binder resin 1 was mixed, and also, the solvent 1 was mixed so that a solid content concentration (concentration of the inorganic filler 9 and the binder resin 1) of a resultant mixed solution was 17% by weight. The resultant mixed solution was stirred and mixed by a thin-film spin system high-speed mixer, so that a uniform coating solution (coating solution 8) was obtained.

Subsequently, a laminated porous film 9 was prepared as in Example 1 except that (i) the coating solution 1 was replaced by the coating solution 8 and (ii) the coating shear rate in Example 1 was changed to a coating shear rate of 1.3 (1/s).

Further, a nonaqueous electrolyte secondary battery 9 was prepared by a method similar to the method of preparing the nonaqueous electrolyte secondary battery in Example 1 except that the laminated porous film 9 was used in place of the laminated porous film 1.

Comparative Example 5

As the inorganic filler, mica (manufactured by Wako Pure Chemical Industries, Ltd., product name: non-swelling mica) having an atomic mass percentage of oxygen of 44% w as used (inorganic filler 10).

Then, with respect to 90 parts by weight of the inorganic filler 10, 10 parts by weight of the binder resin 1 was mixed, and also, the solvent 1 was mixed so that a solid content concentration (concentration of the inorganic filler 10 and the binder resin 1) of a resultant mixed solution was 20% by weight. The resultant mixed solution was stirred and mixed by a thin-film spin system high-speed mixer, so that a uniform coating solution (coating solution 9) was obtained.

Subsequently, a laminated porous film 10 was prepared as in Example 1 except that (i) the coating solution 1 was replaced by the coating solution 9 and (ii) the coating shear rate in Example 1 was changed to a coating shear rate of 0.4 (1/s).

Further, a nonaqueous electrolyte secondary battery 10 was prepared by a method similar to the method of preparing the nonaqueous electrolyte secondary battery in Example 1 except that the laminated porous film 10 was used in place of the laminated porous film 1.

Comparative Example 6

As the inorganic filler, wollastonite (manufactured by Hayashi-Kasei Co., Ltd.; product name: wollastonite VM-8N) having an atomic mass percentage of oxygen of 41% was used (inorganic filler 11).

Then, with respect to 90 parts by weight of the inorganic filler 11, 10 parts by weight of the binder resin 1 was mixed, and also, the solvent 1 was mixed so that a solid content concentration (concentration of the inorganic filler 11 and the binder resin 1) of a resultant mixed solution was 40% by weight. The resultant mixed solution was stirred and mixed by a thin-film spin system high-speed mixer, so that a uniform coating solution (coating solution 10) was obtained.

Subsequently, a laminated porous film 11 was prepared as in Example 1 except that (i) the coating solution 1 was replaced by the coating solution 10 and (ii) the coating shear rate in Example 1 was changed to a coating shear rate of 0.8 (1/s).

Further, a nonaqueous electrolyte secondary battery 11 was prepared by a method similar to the method of preparing the nonaqueous electrolyte secondary battery in Example 1 except that the laminated porous film 11 was used in place of the laminated porous film 1.

[Measurement Results]

The above-described methods were used for measurement of physical properties and the like of the A layer (porous base material), the B layer (porous layer), and the laminated porous film (laminated separator) employing the A layer and the B layer, each of which were produced in each of Examples 1 to 5 and Comparative Examples 1 to 6, and for measurement of a rate characteristic of a nonaqueous electrolyte secondary battery including the laminated separator. Tables 1 and 2 below show results of the measurement. Tables 1 and 2 below also show, as production conditions for producing the laminated porous film, a solid content concentration of the coating solution, a coating shear rate at which the coating solution was applied, and an atomic mass percentage of oxygen of the filler employed.

Note that in Tables 1 and 2, the "Filler" indicates the "inorganic filler" used in each of Examples 1 to 5 and Comparative Examples 1 to 6. Further, in regard to each of Examples 2 to 4, two kinds of compounds and a numerical value (e.g., "99/1" in the case of Example 3) are written in the "Filler" column. This numerical value indicates respective parts by weight of the compounds. For example, "$Al_2O_3$/ZnO 99/1" in the case of Example 3 indicates that 99 parts by weight of $Al_2O_3$ and 1 part by weight of ZnO were mixed.

The "Surface filler aspect ratio" indicates an aspect ratio of a projection image of the inorganic filler at the surface of the porous layer produced in each of Examples 1 to 5 and Comparative Examples 1 to 6. The "Maximum peak intensity ratio of planes orthogonal to each other" means a maximum value of the peak intensity ratio (a degree of orientation of the porous layer) calculated by the following Formula (2) in a case where the following Formula (1) is satisfied by the peak intensities $I_{(hkl)}$ and $I_{(abc)}$ of any diffraction planes (hkl) and (abc) of the porous layer produced in each of Examples 1 to 5 and Comparative Examples 1 to 6, which peak intensities $I_{(hkl)}$ and $I_{(abc)}$ were obtained from the diffraction planes (hkl) and (abc) orthogonal to each other by a wide-angle X-ray diffraction method:

$$I_{(hkl)} > I_{(abc)} \qquad (1), \text{ and}$$

$$I_{(hkl)}/I_{(abc)} \qquad (2).$$

TABLE 1

| | Filler | Surface filler aspect ratio | Maximum peak intensity ratio of planes orthogonal to each other (Degree of orientation of porous layer) | | Rate characteristic 20 C/0.2 C [%] | Coating shear rate [1/s] | Solid content concentration [wt %] | Atomic mass percentage of oxygen [%] | Particle diameter [μm] | | | Specific surface area (m²/g) |
|---|---|---|---|---|---|---|---|---|---|---|---|---|
| | | | | | | | | | D10 | D50 | D90 | |
| Example 1 | ZnO | 1.43 | 1.6 | I(002/I(110) | 52 | 3.9 | 37 | 20 | 0.2 | 0.4 | 2.1 | 7.3 |
| Example 2 | ZrO₂/CaO 95/5 | 1.41 | 2.5 | I(111/I(220) | 55 | 7.9 | 37 | 26 | 0.1 | 1.2 | 7 | 4 |
| Example 3 | Al₂O₃/ZnO 95/1 | 1.73 | 4.0 | I(300/I(006) | 55 | 39.4 | 40 | 47 | 0.4 | 0.8 | 2.2 | 4.5 |
| Example 4 | Al₂O₃/Mica 50/50 | 1.45 | 224 | I(002/I(040) | 66 | 7.9 | 30 | 45 | 0.5 | 4.2 | 11.5 | 4.5 |
| Example 5 | Wollastonite | 2.48 | 99 | I(202/I(040) | 50 | 7.9 | 40 | 41 | 2.4 | 10.6 | 25.3 | 1.3 |

TABLE 2

| | Filler | Surface filler aspect ratio | Maximum peak intensity ratio of planes orthogonal to each other (Degree of orientation of porous layer) | | Rate characteristic 20 C/0.2 C [%] | Coating shear rate [1/s] | Solid content concentration [wt %] | Atomic mass percentage of oxygen [%] | Particle diameter [μm] | | | Specific surface area (m²/g) |
|---|---|---|---|---|---|---|---|---|---|---|---|---|
| | | | | | | | | | D10 | D50 | D90 | |
| Comparative Example 1 | Borax | 1.8 | 1.2 | I(003/I(110) | 34 | 7.9 | 40 | 71 | 6.3 | 27 | 111 | 2.5 |
| Comparative Example 2 | ZnO | 1.34 | 2.3 | I(002/I(110) | 46 | 0.4 | 37 | 20 | 0.2 | 0.4 | 2.1 | 7.3 |
| Comparative Example 3 | Al₂O₃ | 1.22 | 1.7 | I(300/I(006) | 48 | 7.9 | 40 | 47 | 0.4 | 0.6 | 2.1 | 5.7 |
| Comparative Example 4 | Attapulgite | 4.27 | 2.0 | I(200/I(040) | 46 | 1.3 | 17 | 48 | 0.4 | 2 | 3.3 | 235.0 |
| Comparative Example 5 | Mica | 1.67 | 367 | I(002/I(040) | 18 | 0.4 | 20 | 44 | 0.5 | 5.5 | 12.1 | 3.2 |
| Comparative Example 6 | Wollastonite | 4.04 | 99 | I(202/I(040) | 21 | 0.8 | 40 | 41 | 2.4 | 10.6 | 25.3 | 1.3 |

CONCLUSION

It is clear from Tables 1 and 2 that the rate characteristic is better in the nonaqueous electrolyte secondary batteries obtained in Examples 1 to 5 each including a porous layer in accordance with an embodiment of the present invention, which porous layer has (i) an aspect ratio of a projection image of an inorganic filler at a porous layer surface in a range of 1.4 to 4.0 and (ii) a degree of orientation of the porous layer in a range of 1.5 to 300, than in the nonaqueous electrolyte secondary batteries obtained in Comparative Examples 1 to 6 each including a porous layer (i) whose aspect ratio of a projection image of an inorganic filler at a porous layer surface is outside the above range and/or (ii) whose degree of orientation of the porous layer is outside the above range. In other words, the above demonstrated that the porous layer in accordance with an embodiment of the present invention advantageously allows a nonaqueous electrolyte secondary battery including the porous layer in accordance with an embodiment of the present invention to achieve an improved discharge output characteristic.

INDUSTRIAL APPLICABILITY

A porous layer in accordance with an embodiment of the present invention can be suitably used in production of a nonaqueous electrolyte secondary battery excellent in discharge output characteristic (rate characteristic). Therefore, a laminated body, a nonaqueous electrolyte secondary battery separator, an electrode for a nonaqueous electrolyte secondary battery, and a nonaqueous electrolyte secondary battery member each in accordance with an embodiment of the present invention can be widely used in the field of production of nonaqueous electrolyte secondary batteries.

The invention claimed is:

1. A nonaqueous electrolyte secondary battery insulating porous layer comprising an inorganic filler and a resin, wherein:
   an aspect ratio of a projection image of the inorganic filler at a surface of the nonaqueous electrolyte secondary battery insulating porous layer is in a range of 1.4 to 4.0;
   respective peak intensities $I_{(hkl)}$ and $I_{(abc)}$ of any diffraction planes (hkl) and (abc) of the nonaqueous electrolyte secondary battery insulating porous layer satisfy the following Formula (1), the peak intensities being obtained from the diffraction planes (hkl) and (abc) orthogonal to each other by measurement by use of a wide-angle X-ray diffraction method; and a maximum value of a peak intensity ratio is in a range of 1.5 to 300, the peak intensity ratio being calculated by the following Formula (2):

$$I_{(hkl)} > I_{(abc)} \quad (1), \text{ and}$$

$$I_{(hkl)}/I_{(abc)} \quad (2).$$

2. The nonaqueous electrolyte secondary battery insulating porous layer as set forth in claim 1, wherein the resin is at least one selected from the group consisting of an aromatic polyamide and a wholly aromatic polyamide.

3. The nonaqueous electrolyte secondary battery insulating porous layer as set forth in claim 1, wherein the inorganic filler contains a fine particle of a metal oxide having an atomic mass percentage of oxygen of 10% to 50%.

4. A nonaqueous electrolyte secondary battery laminated separator comprising:
a porous base material containing a polyolefin as a main component; and
a nonaqueous electrolyte secondary battery insulating porous layer recited in claim 1, the nonaqueous electrolyte secondary battery insulating porous layer being provided on one surface or both surfaces of the porous base material.

5. A nonaqueous electrolyte secondary battery member comprising:
a positive electrode;
a nonaqueous electrolyte secondary battery insulating porous layer recited in claim 1; and
a negative electrode, the positive electrode, the nonaqueous electrolyte secondary battery insulating porous layer, and the negative electrode being provided in this order.

6. A nonaqueous electrolyte secondary battery comprising:
a nonaqueous electrolyte secondary battery insulating porous layer recited in claim 1.

7. A nonaqueous electrolyte secondary battery member comprising:
a positive electrode;
a nonaqueous electrolyte secondary battery laminated separator recited in claim 4; and
a negative electrode,
the positive electrode, the nonaqueous electrolyte secondary battery laminated separator, and the negative electrode being provided in this order.

8. A nonaqueous electrolyte secondary battery comprising:
a nonaqueous electrolyte secondary battery laminated separator recited in claim 4.

* * * * *